US009992699B2

United States Patent
Shimizu

(10) Patent No.: US 9,992,699 B2
(45) Date of Patent: Jun. 5, 2018

(54) SON CONTROL SYSTEM, SON CONTROL METHOD, AND MOBILE COMMUNICATION SYSTEM

(71) Applicant: NEC CORPORATION, Tokyo (JP)

(72) Inventor: Atsushi Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 209 days.

(21) Appl. No.: 14/898,171

(22) PCT Filed: Dec. 10, 2013

(86) PCT No.: PCT/JP2013/007257
§ 371 (c)(1),
(2) Date: Dec. 14, 2015

(87) PCT Pub. No.: WO2014/203299
PCT Pub. Date: Dec. 24, 2014

(65) Prior Publication Data
US 2016/0127941 A1   May 5, 2016

(30) Foreign Application Priority Data
Jun. 17, 2013 (JP) .................................. 2013-126654

(51) Int. Cl.
*H04L 12/26* (2006.01)
*H04W 28/02* (2009.01)
(Continued)

(52) U.S. Cl.
CPC ......... *H04W 28/021* (2013.01); *H04W 24/02* (2013.01); *H04W 28/0289* (2013.01); *H04W 28/08* (2013.01); *H04W 84/18* (2013.01)

(58) Field of Classification Search
CPC ................................................ H04W 28/021
(Continued)

(56) References Cited

U.S. PATENT DOCUMENTS

2009/0201816 A1* 8/2009 Takahashi ................. H04L 5/14
370/235
2013/0179657 A1* 7/2013 Isomura ................ G06F 3/0605
711/165
2014/0040450 A1* 2/2014 Sanneck ............... H04W 84/18
709/223

FOREIGN PATENT DOCUMENTS

JP   2011-176471 A   9/2011
JP   2012-54736 A    3/2012
(Continued)

OTHER PUBLICATIONS

Communication dated Jan. 24, 2017, issued from the Japanese Patent Office in counterpart application No. 2015-522270.
(Continued)

*Primary Examiner* — Shukri Taha
*Assistant Examiner* — Abdeltif Ajid
(74) *Attorney, Agent, or Firm* — Sughrue Mion, PLLC

(57) ABSTRACT

A mobile communication system (100) in which a SON is implemented includes a load control unit (150). The load control unit (150) obtains D-SON apparatus information including at least a load state of the D-SON apparatus (190) from the D-SON apparatus (190) and also adjusts, based on the obtained D-SON apparatus information, a timing for instructing the D-SON apparatus (190) to execute the C-SON process so that a load on the D-SON apparatus is not concentrated on a time axis. In such a mobile communication system, it is possible to attempt to stabilize an operation of the entire SON even when the load on the D-SON apparatus is heavy.

6 Claims, 6 Drawing Sheets

(51) Int. Cl.
*H04W 24/02* (2009.01)
*H04W 28/08* (2009.01)
*H04W 84/18* (2009.01)

(58) Field of Classification Search
USPC .......................................................... 370/326
See application file for complete search history.

(56) References Cited

FOREIGN PATENT DOCUMENTS

| WO | 2012/110078 A1 | 8/2012 |
|---|---|---|
| WO | 2012/143055 A1 | 10/2012 |
| WO | 2013/044512 A1 | 4/2013 |

OTHER PUBLICATIONS

Communication dated Feb. 10, 2017, issued from the European Patent Office in counterpart European Application No. 13887196.7.

3GPP TSG-SA5, (Telecom Management), "Proposal for centralised SON architecture for Handover Parameter Optimisation", Meeting SA5-RAN3 Joint Meeting, Jan. 12-13, 2009, Sophia Antipolis France, Huawei, XP50335479A, pp. 1-7.

3GPP TS 28.628 V1.0.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS); (Release 11), Nov. 2012, pp. 1-41.

3GPP TS 32.522 V11.5.1, 3rd Generation Partnership Project; Technical Specification Group Services and System Aspects; Telecommunication management; Self-Organizing Networks (SON) Policy Network Resource Model (NRM) Integration Reference Point (IRP); Information Service (IS); (Release 11), Mar. 2013, pp. 1-25.

Vodafone, T-mobile, france telecom, kpn, "Top 10 Operations Requirements", Requirements #5, 8, 9, 10, S5w100010, 3GPP, Mar. 30, 2010, 8 Pages.

International Search Report for PCT/JP2013/007257 dated Feb. 10, 2014 [PCT/ISA/210].

\* cited by examiner

SON CONTROL SYSTEM, SON CONTROL METHOD, AND MOBILE COMMUNICATION SYSTEM

CROSS REFERENCE TO RELATED APPLICATIONS

This application is a National Stage of International Application No. PCT/JP2013/007257, filed on Dec. 10, 2013, which claims priority from Japanese Patent Application No. 2013-126654, filed on Jun. 17, 2013, the contents of all of which are incorporated herein by reference in their entirety.

TECHNICAL FIELD

The present invention relates to a technique for SON (Self Organizing Network) control which is performed on a mobile communication system.

BACKGROUND ART

In the field of mobile communications, LTE (Long Term Evolution), which is a next-generation radio technology, has been attracting attention. The SON (Self Organizing Network), which automates installation and operation of base stations, has been expected to contribute to the spread and expansion of the LTE. The functions of the SON are specified in release 8 of 3GPP (3rd Generation Partnership Project) which is an organization for standardizing radio technology. Techniques from various perspectives have been suggested in regard to the implementation of the SON (for example in Patent Literature 1 and 2).

Normally in the SON, control for collecting measurement data of network quality and the like from base stations (eNB: enhanced NodeB) and terminals that are in operation, analyzing such data, and autonomously optimizing the operations of the base stations is performed. Thus, the SON is expected to save the trouble of establishing and operation management of the mobile communication system, which is increasing in scale, and to improve the communication quality. Hereinafter, the control by the SON shall be referred to as "SON control".

Regarding the SON control, there is a known method of implementation to realize the SON, which is to use one C-SON apparatus (C-SON: Centralized-SON) and a plurality of D-SON apparatuses (D-SON: Distributed-SON).

The C-SON apparatus covers all eNBs in the mobile communication system where eNBs from different vendors exist and performs a process of the SON control on each eNB.

The D-SON apparatus covers eNB(s) from only one vendor and performs the process of the SON control on one or a plurality of the eNBs from that vendor. The process performed by the D-SON apparatus includes a process for reporting configuration information on the eNBs that are covered by the D-SON apparatus to the C-SON apparatus and a process that is instructed by the C-SON apparatus for updating information on neighboring cells. These processes shall be hereinafter referred to as a "C-SON process".

CITATION LIST

Patent Literature

Patent Literature 1: Japanese Unexamined Patent Application Publication No. 2012-054736

Patent Literature 2: Japanese Unexamined Patent Application Publication No. 2011-176471

SUMMARY OF INVENTION

Technical Problem

However, in addition to the above reporting to the C-SON apparatus, which is regularly done, it is necessary for the D-SON apparatus to perform the update process (processes such as addition/change/deletion of the neighboring cell), which is instructed by the C-SON apparatus at the time of installing the eNB and changing the setting. Therefore, as the eNB increases, a load until a stable operation is achieved with a limited server configuration continues to increase.

Especially at the time of installing the base station, a plurality of processes such as handling a number of messages requesting registration of neighboring cells, detecting PCI (Physical Cell Identifier) confusion, and the regular report made to the C-SON apparatus overlap, and thus the load on the D-SON apparatus is temporally concentrated, thereby resulting in a large amount of load. This consequently leads to a problem that the operation of the entire SON becomes unstable.

The present invention has been made in light of the above-mentioned circumstances and provides a technique for attempting to stabilize the operation of the entire SON even when the load on the D-SON apparatus is heavy.

Solution to Problem

An exemplary aspect of the present invention is a method of performing SON control on a mobile communication system.

In this method, D-SON apparatus information including at least a load state of a D-SON apparatus is obtained from the D-SON apparatus, and a timing for instructing the D-SON apparatus to execute a C-SON process is adjusted based on the obtained D-SON apparatus information so that a load on the D-SON apparatus is not concentrated temporally.

Note that implementations of the SON control method according to the above-mentioned exemplary aspect in the form of a system and an apparatus, and a program for causing a computer to execute a process based on the SON control method, a storage medium which stores the program, a mobile communication system on which the SON control method is performed and the like may also be effective as exemplary aspects of the present invention.

Advantageous Effects of Invention

The technique according to the present invention can attempt to stabilize the operation of the entire SON even when the load on the D-SON apparatus is heavy.

DESCRIPTION OF EXEMPLARY EMBODIMENTS

Figure 1:
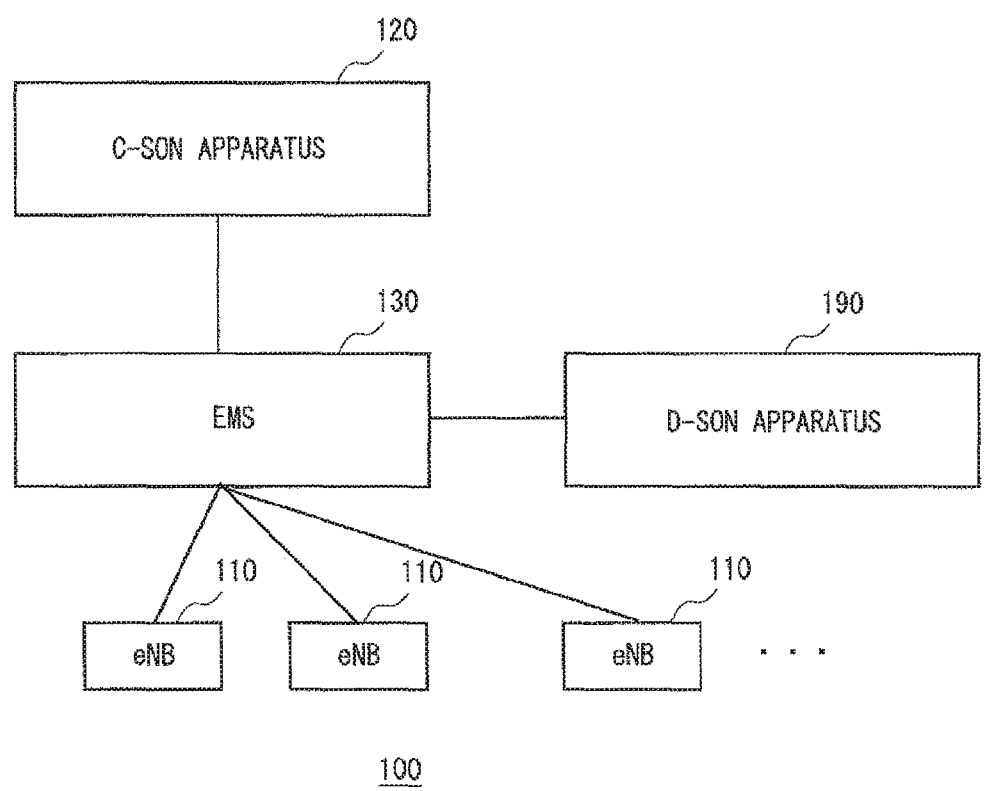
FIG. 1 is a drawing showing a mobile communication system according to a first exemplary embodiment.

Hereinafter, exemplary embodiments of the present invention will be described with reference to the drawings. To clarify the explanation, some parts thereof and some of the drawings have been omitted or simplified as appropriate. Further, it is to be understood by those skilled in the art that the elements illustrated in the drawings as functional blocks for performing various processes can be implemented hardware-wise, software-wise (program), or a combination of them and are not limited to being implemented by hardware alone or software alone. Note that in the drawings, the same elements are denoted by the same reference numerals, and repeated descriptions are omitted as needed.

Moreover, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Exemplary Embodiment

FIG. 1 shows a mobile communication system 100 according to a first exemplary embodiment of the present invention. The mobile communication system 100 is an LTE communication system in which the SON is implemented and includes a plurality of base stations (eNBs) 110, a C-SON apparatus 120, an EMS 130, and a D-SON apparatus 190.

The C-SON apparatus 120 covers all the eNBs 110 in the mobile communication system 100 and performs the process of the SON control on these eNBs 110.

The D-SON apparatus 190 supports only one vendor, covers one or more eNB(s) 110 from that vendor, and performs the process of the SON control on each eNB 110 that is covered by the D-SON apparatus 190. The process performed by the D-SON apparatus 190 includes the C-SON process. As described above, the C-SON process includes the report made to the C-SON apparatus 120 and the update of neighboring cells which is instructed by the C-SON apparatus 120.

Note that in FIG. 1, although only one D-SON apparatus 190 is shown, it is to be understood that the number of the D-SON apparatuses 190 is greater than or equal to the number of the vendor(s) of the base station(s) in the mobile communication system 100.

The EMS 130 is an EMS (Element Management System) which supports the same vendor as the vendor which the D-SON apparatus 190 supports. Note that the number of the EMSs disposed corresponds to the number of the vendors of the base stations in the mobile communication system 100.

In this exemplary embodiment, the C-SON apparatus 120 instructs the D-SON apparatus 190 to perform the C-SON process via the EMS 130. Specifically, when the D-SON apparatus 190 is instructed to perform the C-SON process, the C-SON apparatus 120 gives an instruction to the EMS 130, and the EMS 130 instructs the D-SON apparatus 190 to execute the instructed process.

Note that other than instructing the D-SON apparatus 190 to execute the C-SON process in accordance with the instruction from the C-SON apparatus 120, the EMS 130 may autonomously start a part of the C-SON process, for example, the process to report the configuration information on each eNB which is controlled by the D-SON apparatus 190 to the C-SON apparatus 120.

Further, in this exemplary embodiment, in order to reduce the load on the D-SON apparatus 190, the EMS 130 provides the configuration information on the eNB 110 to the D-SON apparatus 190.

In the mobile communication system 100 according to this exemplary embodiment, the EMS 130 can adjust a timing for executing the C-SON process when the EMS 130 instructs the D-SON apparatus 190 to execute the C-SON process.

Figure 2:
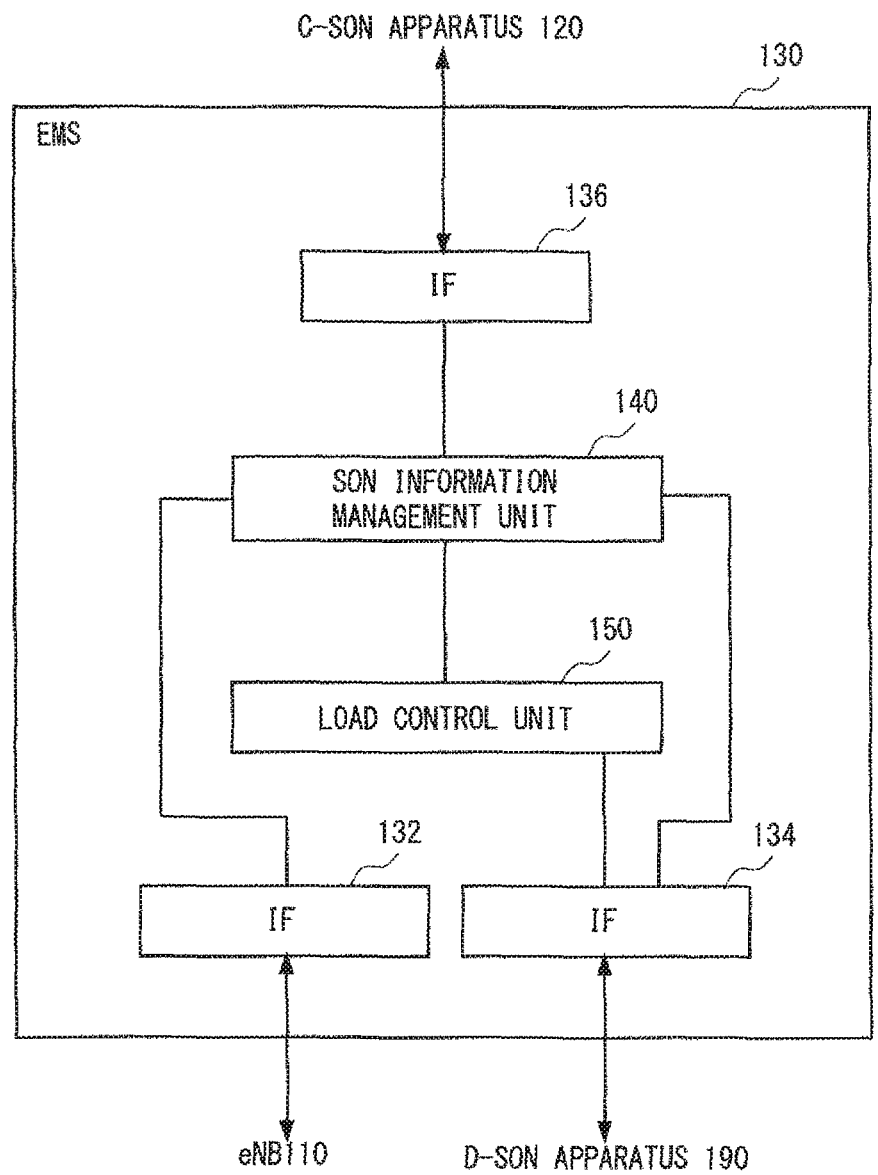
FIG. 2 is a drawing showing an EMS in the mobile communication system shown in FIG. 1.

FIG. 2 shows the EMS 130 in the mobile communication system 100. The EMS 130 includes three interfaces (IFs 132, 134, and 136), a SON information management unit 140, and a load control unit 150.

The IF 132 is an interface which is connected to the eNB 110. The IF 134 is an interface which is connected to the D-SON apparatus 190. Moreover, the IF 136 is an interface which is connected to the C-SON apparatus 120. The EMS 130 is connected to the eNBs 110, the C-SON apparatus 120, and the D-SON apparatus 190 via these interfaces.

The SON information management unit 140 collects SON information from the eNB 110 and radio terminals that are connected to the corresponding eNB 110 via the IF 132, provides the SON information to the C-SON apparatus 120 via the IF 136, and provides the SON information to the D-SON apparatus 190 via the IF 134. Further, the SON information management unit 140 transfers the instruction for control from the C-SON apparatus 120 to the eNB 110 or the D-SON apparatus 190.

The instruction for control from the C-SON apparatus 120 includes an instruction relating to the C-SON process which is executed by the D-SON apparatus 190. The SON information management unit 140 outputs the instruction relating to the C-SON process to the load control unit 150.

The load control unit 150 instructs the D-SON apparatus 190 to execute the C-SON process in accordance with the instruction received via the load control unit 150 or instructs the D-SON apparatus 190 to execute the C-SON process autonomously. In this exemplary embodiment, the load control unit 150 can adjust the timing for instructing the D-SON apparatus 190 to execute the C-SON process.

To be more specific, the load control unit 150 obtains D-SON apparatus information including a load state of the D-SON apparatus 190 and adjusts the timing for instructing the D-SON apparatus 190 to execute the C-SON process so that the load on the D-SON apparatus 190 will not be temporally concentrated.

Figure 3:
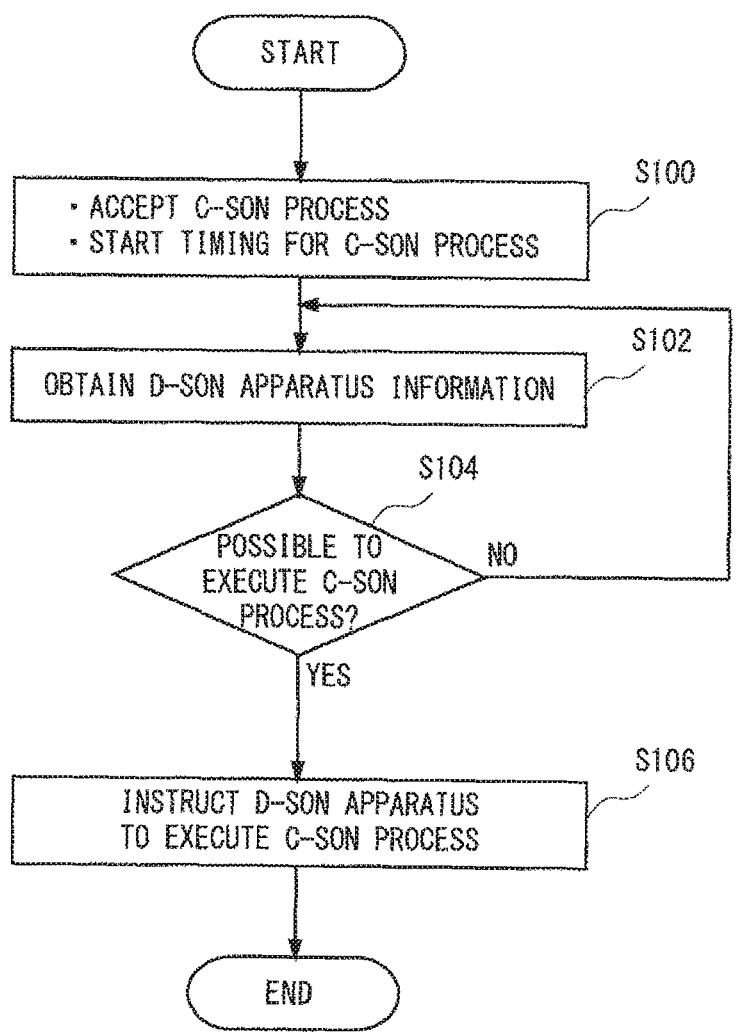
FIG. 3 is a flowchart showing processes conducted by a load control unit in the EMS shown in FIG. 3.

The process by the load control unit 150 will be described in more detail with reference to the flowchart shown in FIG. 3.

In response to the instruction for executing the C-CON process from the C-SON apparatus 120 or at a trigger for autonomously starting the C-SON process (for example, when the predetermined time has come), the load control unit 150 in the EMS 130 obtains the D-SON apparatus information from the D-SON apparatus 190 via the IF 134 (S100 and S102). As described above, in this exemplary embodiment, the D-SON apparatus information includes the load state of the D-SON apparatus 190.

The load state of the D-SON apparatus 190 is, for example, one or two of the following factors: the number of processes remaining in a queue of the D-SON apparatus 190; and a memory utilization. In this exemplary embodiment, the load control unit 150 obtains the two of the factors as the load state of the D-SON apparatus 190.

Next, the load control unit 150 evaluates as to whether or not to instruct the D-SON apparatus 190 to execute the C-SON process that has been accepted in the step S100 or the C-SON process which should be autonomously started based on the D-SON apparatus information (the load state of the D-SON apparatus 190) which is obtained in the step S102 (S104).

Specifically, when any one of the following two conditions is satisfied, the load control unit 150 evaluates that the D-SON apparatus 190 cannot execute the C-SON process. When neither of the following conditions is satisfied, the load control unit 150 evaluates that the D-SON apparatus 190 can execute the C-SON process.
<Condition 1>
The memory utilization of the D-SON apparatus 190 is greater than or equal to a threshold (e.g. 80%).

Note that this threshold is adjusted according to the specification of the D-SON apparatus 190 and is preliminarily set.
<Condition 2>
The number of processes remaining in the queue of the D-SON apparatus 190 is greater than or equal to a threshold (e.g. 100).

This threshold is also adjusted according to the specification of the D-SON apparatus 190 and is preliminarily set.

When the load control unit 150 evaluates that the D-SON apparatus 190 can execute the C-SON process (S104: Yes), the load control unit 150 instructs the D-SON apparatus 190 via the IF 134 to execute the C-SON process that has been accepted in the step S100 or the C-SON process that should be autonomously started (S106).

On the other hand, when the load control unit 150 evaluates that the D-SON apparatus 190 cannot execute the C-SON process (S104: No), the load control unit 150 returns to the step S102. After that, the processes from the step S102 are repeated.

In the mobile communication system 100 according to this exemplary embodiment, as the load control unit 150 in the EMS 130 temporally distributes the load on the D-SON apparatus 190 from the EMS 130 or the C-SON apparatus 120 according to the load state (the C-SON process) of the D-SON apparatus 190, it is possible to attempt to stabilize the functions of the entire SON even when the load on the D-SON apparatus 190 increases due to an increase of the eNBs and the like.

Moreover, as it is not necessary to allocate an observer at all times or increase the capacity of a server apparatus of the D-SON apparatus 190, the cost can be reduced.

Second Exemplary Embodiment

The second exemplary embodiment of the present invention is also a mobile communication system in which the SON is implemented. The mobile communication system is similar to the mobile communication system 100 except for an EMS 230 shown in FIG. 4 that is disposed in place of the EMS 130. Therefore, only the EMS 230 shall be explained in regard to the mobile communication system of the second exemplary embodiment.

Figure 4:
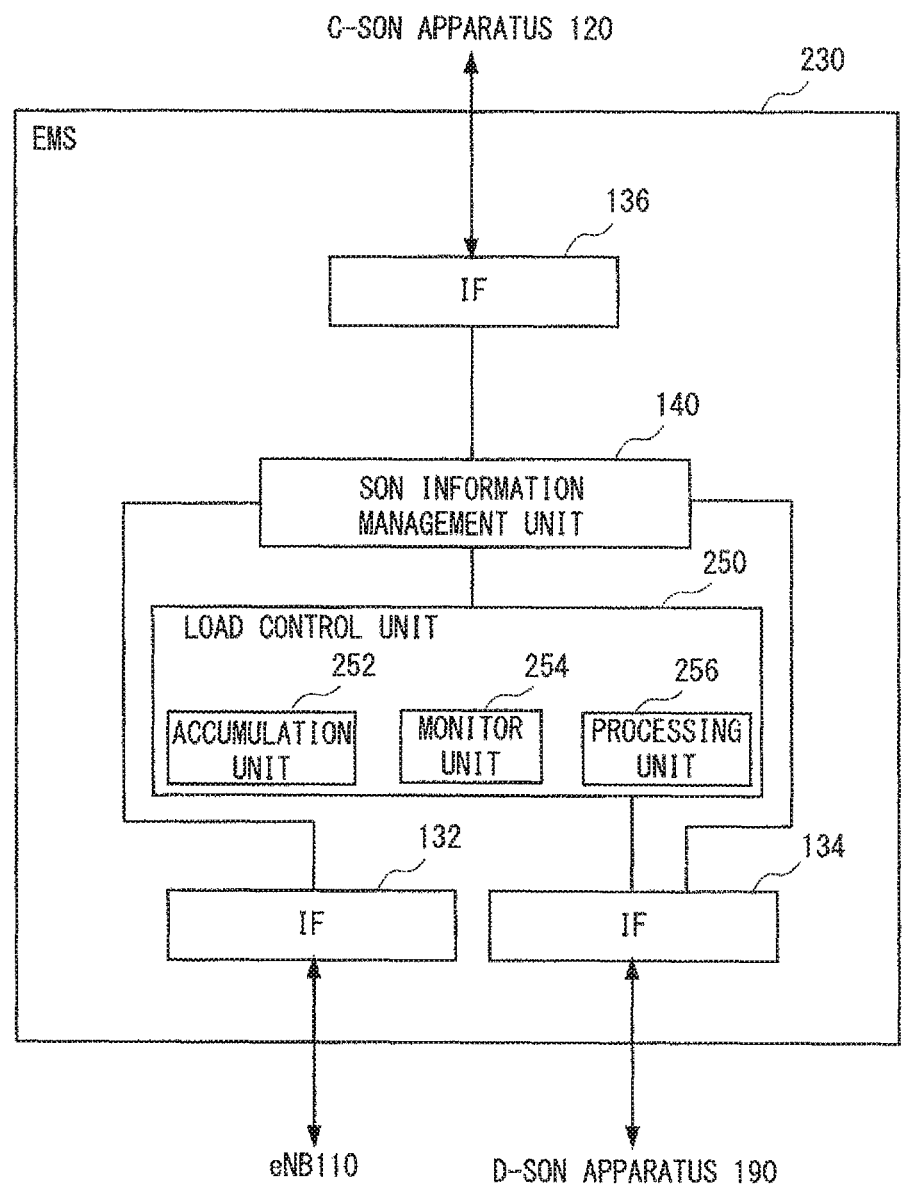
FIG. 4 is a drawing showing an EMS in a mobile communication system according to a second exemplary embodiment.

As shown in FIG. 4, the EMS 230 in the mobile communication system according to the second exemplary embodiment includes the three interfaces (IFs 132, 134, and 136), the SON information management unit 140, and a load control unit 250. The IFs 132 to 136 and the SON information management unit 140 are the same as the corresponding functional blocks in the EMS 130 of the mobile communication system 100.

The load control unit 250 includes an accumulation unit 252, a monitor unit 254, and a processing unit 256. The accumulation unit 252 regularly obtains history information which indicates a result of the processes conducted by the D-SON apparatus 190 via the IF 134 and accumulates the history information. The history information includes, for example, the information indicating the process of updating the information on the neighboring cell that is conducted by the unit of time, for example, yearly or daily, the PCI Confusion detection process, a TNL Address Discovery process, and a history of a CPU utilization.

Further, the accumulation unit 252 holds, for every given number of processes remaining in the queue of the D-SON apparatus 190 (for example, for every 100 processes such as 100 and 200 processes etc.), an average value of the time until the number of remaining processes will be lowered so as to become equal to the number of remaining processes which enables the D-SON apparatus 190 to execute the C-SON process (for example, less than 100 processes).

In addition to the memory utilization of the D-SON apparatus 190 and the number of processes remaining in the queue of the D-SON apparatus 190, the monitor unit 254 obtains the current CPU utilization of the D-SON apparatus 190.

The processing unit 256 adjusts the timing to instruct the D-SON apparatus 190 to execute the C-SON process based on the history information accumulated in the accumulation unit 252 and the information obtained by the monitor unit 254. Specifically, in this exemplary embodiment, the D-SON apparatus information includes the history information that is accumulated in the accumulation unit 252 and the load state (the memory utilization and the number of processes remaining in the queue) of the D-SON apparatus 190 that is obtained by the monitor unit 254.

The process by the load control unit 250, in particular the processing unit 256, shall be explained in more detail with reference to the flowchart shown in FIG. 5.

In response to the instruction for conducting the C-SON process from the C-SON apparatus 120 or at a trigger indicating to autonomously start the C-SON process, in the load control unit 250 of the EMS 230, the monitor unit 254 obtains the load state of the D-SON apparatus 190 and outputs it to the processing unit 256, and the processing unit 256 obtains the load state obtained by the monitor unit 254 and the history information accumulated in the accumulation unit 252 as the D-SON apparatus information (S200 and S202). In this exemplary embodiment, the D-SON apparatus information includes the load state of the D-SON apparatus 190 (the memory utilization and the number of processes remaining in the queue) at the time when the load state is obtained from the D-SON apparatus 190 and the CPU utilization for the past predetermined period of time (e.g. for one minute) that is accumulated in the accumulation unit 252.

Next, the processing unit 256 evaluates as to whether or not to instruct the D-SON apparatus 190 to execute the C-SON process that has been accepted by the EMS 230 in the step S200 or the C-SON process which should be autonomously started based on the D-SON apparatus information (the history information and the load state) that has been obtained in the step S202 (S204).

Specifically, when any one of the following three conditions is satisfied, the processing unit 256 evaluates that the D-SON apparatus 190 cannot execute the C-SON process. On the other hand, when none of the following three conditions is satisfied, the processing unit 256 evaluates that the D-SON apparatus 190 can execute the C-SON process.
<Condition 1>

The memory utilization of the D-SON apparatus 190 is greater than or equal to a threshold (e.g. 80%).

Note that this threshold is adjusted according to the specification of the D-SON apparatus 190 and is preliminarily set.
<Condition 2>

The number of processes remaining in the queue of the D-SON apparatus 190 is greater than or equal to a threshold (e.g. 100).

This threshold is also adjusted according to the specification of the D-SON apparatus 190 and is preliminarily set.
<Condition 3>

The CPU utilization of the D-SON apparatus 190 is continuously greater than or equal to a threshold (e.g. 80%) for one minute. Note that the above threshold of the CPU utilization is also adjusted according to the specification of the D-SON apparatus 190 and is preliminarily set.

When the processing unit 256 evaluates that the D-SON apparatus 190 can execute the C-SON process (S204: Yes), the processing unit 256 instructs the D-SON apparatus 190 via the IF 134 to execute the C-SON process that has been accepted in the step S200 or the C-SON process that should be autonomously started (S206).

On the other hand, when the processing unit 256 evaluates that the D-SON apparatus 190 cannot execute the C-SON process (S204: No), the processing unit 256 evaluates as to whether the load on the D-SON apparatus 190 is likely to be immediately reduced to the level which enables the execution of the C-SON process (S210).

To be specific, when any one of the following conditions A and B is satisfied, the load control unit 250 evaluates the load on the D-SON apparatus 190 as being "likely" to be reduced as described above, while when two of the conditions A and B are not satisfied, the load control unit 250 evaluates the load on the D-SON apparatus 190 as being "unlikely" to be reduced as described above.
<Condition A>

The value that has led to the evaluation that "the C-SON process cannot be executed" in the step S204, in which the value corresponds to the condition that is not satisfied from among the conditions 1 to 3, is in the vicinity of a threshold specified by this condition. A difference between the value corresponding to the above condition and a threshold specified by this condition is, for example, about 10% of the threshold.

When, for example, the conditions 2 and 3 of the above-mentioned three conditions are not satisfied, and the memory utilization of the D-SON apparatus 190 is 85%, which is greater than the threshold of 80%. Thus, an evaluation is made that "the C-SON process cannot be executed". However, 85% is a value that is in the vicinity of 80%. In this case, it is evaluated as being "likely" in the step S210.
<Condition B>

At least one parameter from among the number of processes remaining in the queue, the CPU utilization, and the memory utilization is on a downward trend.

For example, the following method can be used to evaluate as to whether or not there is a downward trend. For easier understanding, a parameter shall be X.

Firstly, a value of X in a predetermined length of a period in the past is approximated by a linear equation shown in an expression (1) using the method of least squares in order to calculate a coefficient "a" in the expression (1). Then, if the calculated coefficient "a" is smaller than zero, the parameter is evaluated as being on a downward trend.

$$f(X) = aX + b \tag{1}$$

a and b: coefficients

In the step S210, when the load on the control apparatus 190 is evaluated as being likely to be immediately reduced to the level which enables the execution of the C-SON process (S210: Yes), the processing unit 256 waits for a predetermined short time (e.g. about one minute). After one minute, the processing unit 256 evaluates as to whether or not the load on the D-SON apparatus 190 has been immediately reduced to the level which enables the execution of the C-SON process (S214). The conditions used for this evaluation are the same as the three conditions that have been used in the evaluation in the step S204.

When it is evaluated that the load on the D-SON apparatus 190 has reduced to the level which enables the execution of the C-SON process (S214: Yes), the processing unit 256 instructs the D-SON apparatus 190 to execute the C-SON process that has been accepted in the step S200 or the C-SON process that should be autonomously started (S206).

On the other hand, when the processing unit 256 evaluates that the load on the D-SON apparatus 190 has not been reduced to the level which enables the execution of the C-SON process (S214: No), the processing unit 256 calculates a time T that is required for the load on the D-SON apparatus 190 to be reduced to the level which enables the execution of the C-SON process (S216).

The calculation process in the step S216 is performed based on the number of processes remaining in the queue of the D-SON apparatus 190 and the average value of the time required for the number of remaining processes to be lowered to the level which enables the D-SON apparatus 190 to execute the C-SON process. The average value of the time is held in the accumulation unit 252 and corresponds to the number of remaining processes.

For example, the current number of processes remaining in the D-SON apparatus 190 is 240. Further, the accumulation unit 252 holds an average value $T_{200}$ of the time required for the number of remaining processes to become the number of remaining processes which enables the D-SON apparatus 190 to execute the C-SON process for the number of remaining processes 200 that is the number closest to "240". The processing unit 256 calculates the time T in accordance with a following expression (2).

$$\text{Time } T = (T_{200}/100) \times \text{the number of remaining processes in subtraction} \tag{2}$$

The processing unit 256 does not instruct the D-SON apparatus 190 to execute the C-SON process till the calculated time T and waits (S218). At the time T, the processing unit 256 returns to the step S202. After that, the processes from the step S202 are repeated.

In the mobile communication system according to this second exemplary embodiment, the load control unit 250 evaluates as to whether or not to instruct the D-SON apparatus 190 to execute the C-SON process based on the current load state of the D-SON apparatus 190 and the history information. It is thus possible for the communication system of this second exemplary embodiment to avoid temporal concentration of the load on the D-SON apparatus 190 more efficiently than the mobile communication system 100 does.

Third Exemplary Embodiment

Figure 6:
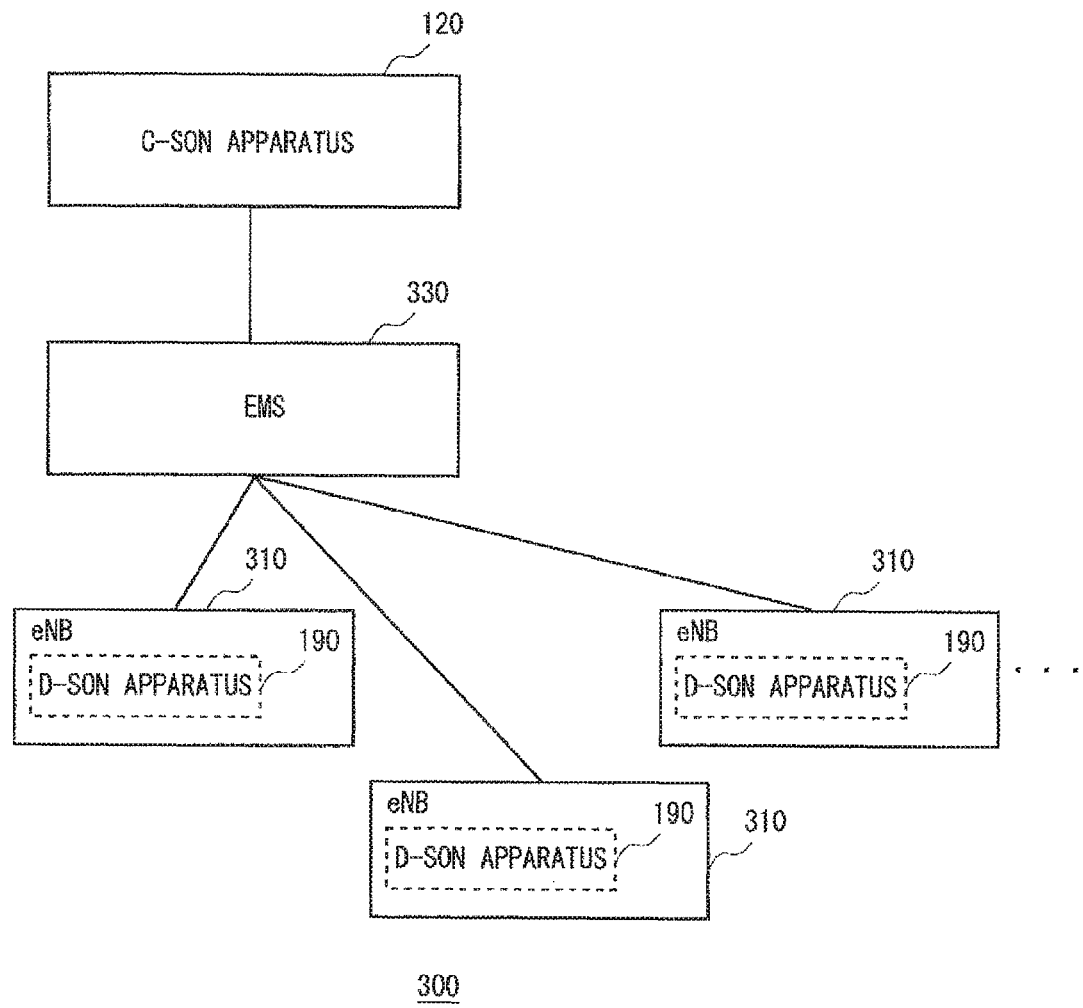
FIG. 6 is a drawing showing a mobile communication system according to a third exemplary embodiment.

FIG. 6 is a mobile communication system 300 according to a third exemplary embodiment of the present invention. The mobile communication system 300 is also a mobile communication system in which the SON is implemented and includes a plurality of eNBs 310, the C-SON apparatus 120, and an EMS 330.

In the mobile communication system 300, the D-SON apparatuses 190 are disposed inside the respective eNBs 310. The mobile communication system 300 is the same as the mobile communication system according to the above-described first and second exemplary embodiments except for the above point. Note that the EMS 330 may be the EMS 130 according to the first exemplary embodiment or the EMS 230 according to the second exemplary embodiment.

The technique according to the present invention can achieve the above-described effects even when the technique is applied to the mobile communication system shown in FIG. 6 in which the D-SON apparatuses are disposed inside the eNBs.

Although the present invention has been explained with reference to the exemplary embodiments, the present invention is not limited by the same. Various modifications, obvious to those skilled in the art, can be made to the configurations and details of the present invention within the scope of the invention.

Figure 5:
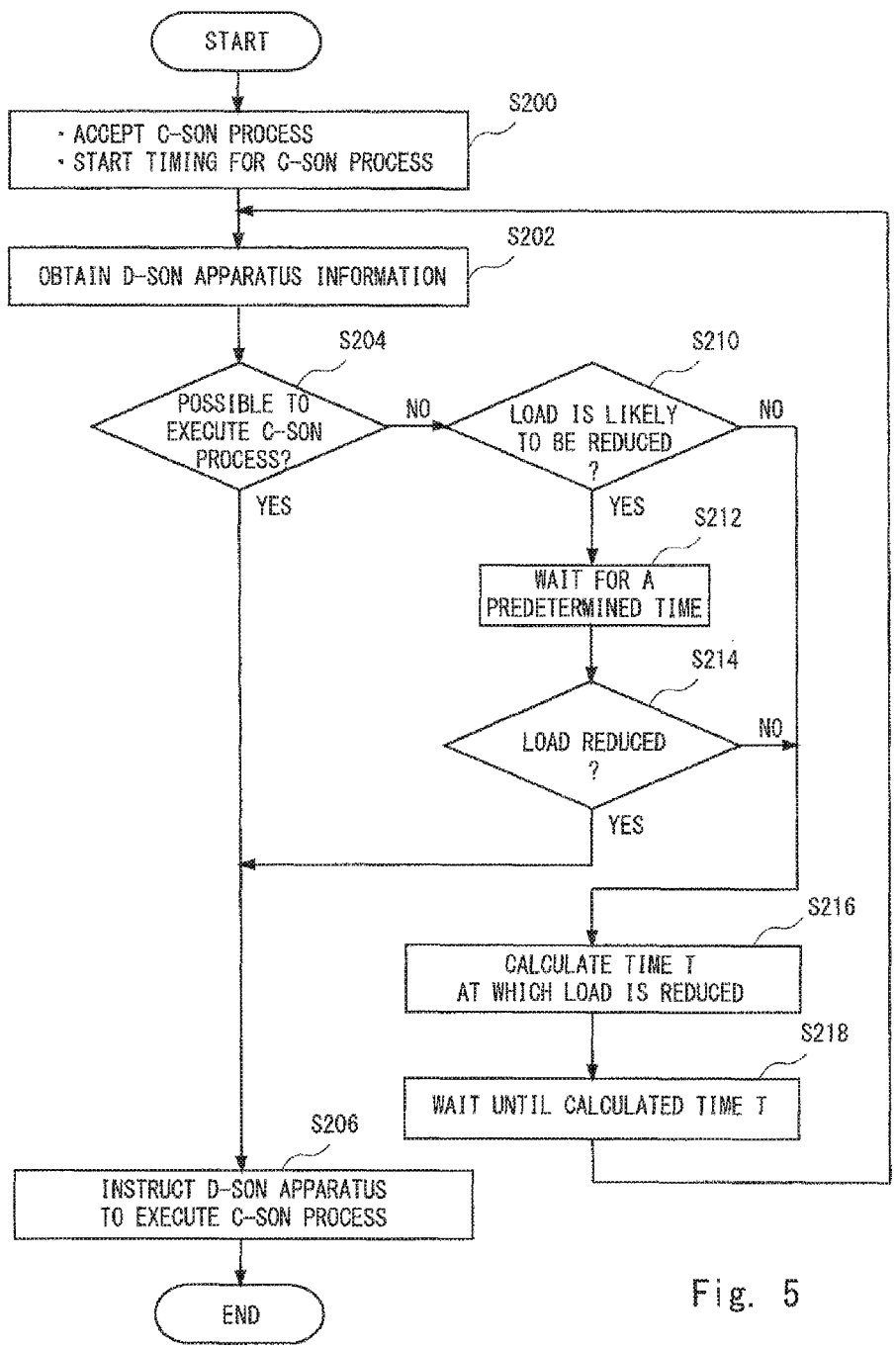
FIG. 5 is a flowchart showing processes conducted by a load control unit in the EMS shown in FIG. 4.

For example, after the load control unit 250 according to the second exemplary embodiment calculates the time T in accordance with the expression (2) in the step S216 of the flowchart shown in FIG. 5 and evaluates that the time is within the date and the period of time in the past in which the number of processes remaining in the queue was large, the load control unit 250 corrects the time T so that the time T will not be included in the period of time.

Specifically, when the time calculated as being the time T in the step S216 is, for example, AM0.05 on January 1st, and from the past process history, the number of processes remaining in the queue is large, that is, around AM0.05, on January 1st, the time T is corrected, so that the time T will be a time elapsed for a predetermined time from AM0.05 on January 1st.

Further, the above exemplary embodiments are examples in which the technique of the present invention is applied to a system in which the D-SON apparatus obtains the configuration information of the eNBs and the like from the EMS. However, the present invention can be applied to a system in which the D-SON apparatus itself monitors the eNBs and obtains the configuration information on those eNBs.

Furthermore, in the above exemplary embodiments, the C-SON apparatus instructs the D-SON apparatus to execute the C-SON process via the EMS, and then the EMS instructs the D-SON apparatus to execute the C-SON process in accordance with the instruction from the C-SON apparatus or instructs the D-SON apparatus to execute the C-SON process autonomously. However, the present invention can be applied to a system without an intervention by the EMS so as to execute the C-SON process. In such a case, the load control unit may be disposed in, for example, the C-SON apparatus, not in the EMS.

The present application claims priority rights of and is based on Japanese Patent Application No. 2013-126654 filed on Jun. 17, 2013 in the Japanese Patent Office, the entire contents of which are hereby incorporated by reference.

REFERENCE SIGNS LIST

100 MOBILE COMMUNICATION SYSTEM
110 eNB (BASE STATION)
120 C-SON APPARATUS
130 EMS (ELEMENT MANAGEMENT SYSTEM)
132 IF (INTERFACE)
134 IF (INTERFACE)
136 IF (INTERFACE)
140 SON INFORMATION MANAGEMENT UNIT
150 LOAD CONTROL UNIT
190 D-SON APPARATUS
230 EMS (ELEMENT MANAGEMENT SYSTEM)
250 LOAD CONTROL UNIT
252 ACCUMULATION UNIT
254 MONITOR UNIT
256 PROCESSING UNIT
300 MOBILE COMMUNICATION SYSTEM
310 eNB (BASE STATION)
330 EMS (ELEMENT MANAGEMENT SYSTEM)

The invention claimed is:

1. A SON control system for performing SON (Self Organizing Network) control on a mobile communication system, the SON control being control based on a SON, the SON control system comprising:
a C-SON (Centralized-SON) apparatus that covers base stations from a plurality of vendors and performs a process for the SON control on the base stations that are covered;
a D-SON (Distributed-SON) apparatus that covers one or more base stations from one vendor, performs the process for the SON control on the base stations that are covered, and performs a process including a C-SON process, the C-SON process including sending a report to the C-SON apparatus and a process instructed by the C-SON apparatus; and
a load control unit that obtains D-SON apparatus information including at least a load state of the D-SON apparatus from the D-SON apparatus and adjusts, based on the obtained D-SON apparatus information, a timing for instructing the D-SON apparatus to execute the C-SON process so that a load on the D-SON apparatus is not concentrated on a time axis;
wherein:
the load state of the D-SON apparatus includes the number of processes remaining in the queue of the D-SON apparatus, and
the load control unit is configured to:
hold, for every number of processes remaining in the queue of the D-SON apparatus, an average time until the number of processes remaining in the queue of the D-SON apparatus becomes a number that enables the D-SON apparatus to execute the C-SON process; and set, when it is evaluated that the timing for instructing the D-SON apparatus to execute the C-SON process should be moved to a later time, the timing for instructing the D-SON apparatus to execute the C-SON process based on the average time that corresponds to the current number of processes remaining in the queue of the D-SON apparatus.

2. The SON control system according to claim 1, further comprising an EMS (Element Management System) for instructing the D-SON apparatus to execute the C-SON process in accordance with an instruction from the C-SON apparatus or autonomously, wherein the load control unit is disposed in the EMS.

3. The SON control system according to claim 1, wherein the D-SON apparatus information further includes history information including at least a past CPU utilization of the D-SON apparatus.

4. The SON control system according to claim 1, wherein the load control unit is configured to move, when the set timing is included in a period of time in which the load on the D-SON apparatus is concentrated, the timing to a later time so that the timing is not included in the period of time.

5. A mobile communication system comprising the SON control system according to claim 1.

6. A method of performing SON (Self Organizing Network) control on a mobile communication system, the SON control being control based on a SON, the method comprising:

performing, by a C-SON (Centralized-SON) apparatus that covers base stations from a plurality of vendors, a process for the SON control on the base stations that are covered;

performing, by a D-SON (Distributed-SON) apparatus for performing the process for covering one or more base stations from one vendor and performing the SON control on the base stations that are covered, a process including a C-SON process, the C-SON process including sending a report to the C-SON apparatus and a process instructed by the C-SON apparatus; and obtaining D-SON apparatus information including at least a load state of the D-SON apparatus from the D-SON apparatus and adjusting, based on the obtained D-SON apparatus information, a timing for instructing the D-SON apparatus to execute the C-SON process so that a load on the D-SON apparatus is not concentrated on a time axis;

wherein: the load state of the D-SON apparatus includes the number of processes remaining in the queue of the D-SON apparatus, and the method further comprises:

holding, for every number of processes remaining in the queue of the D-SON apparatus, an average time until the number of processes remaining in the queue of the D-SON apparatus becomes a number that enables the D-SON apparatus to execute the C-SON process; and setting, when it is evaluated that the timing for instructing the D-SON apparatus to execute the C-SON process should be moved to a later time, the timing for instructing the D-SON apparatus to execute the C-SON process based on the average time that corresponds to the current number of processes remaining in the queue of the D-SON apparatus.

* * * * *